United States Patent [19]
Lui

[11] Patent Number: 5,435,552
[45] Date of Patent: Jul. 25, 1995

[54] ELECTRONIC GAME

[75] Inventor: Mung-Ping Lui, Kowloon, Hong Kong

[73] Assignee: Welback Enterprises Ltd., Hong Kong

[21] Appl. No.: 126,776

[22] Filed: Sep. 27, 1993

[51] Int. Cl.⁶ ............................................. G07F 17/32
[52] U.S. Cl. .................... 273/85 G; 273/460; 273/118 A; 273/153 R; 273/434
[58] Field of Search ............ 273/85 G, 121 A, 118 A, 273/119 A, 122 A, 123 A, 153 R, 138 A, 433, 434, 460

[56] References Cited

U.S. PATENT DOCUMENTS

| | | | |
|---|---|---|---|
| 4,311,310 | 1/1982 | Dankman et al. | 273/118 A |
| 4,325,551 | 4/1982 | Kulesza et al. | 273/110 |
| 4,375,286 | 3/1983 | Seitz et al. | 273/121 A |
| 4,508,343 | 4/1985 | Peters et al. | 273/119 A |
| 4,923,201 | 5/1990 | Nichol et al. | 273/118 A |
| 4,976,434 | 12/1990 | Wikner | 273/119 A X |
| 5,014,991 | 5/1991 | Mirando et al. | 273/138 A |
| 5,121,919 | 6/1992 | Martti | 273/121 B |

Primary Examiner—Vincent Millia
Assistant Examiner—Kerry Owens
Attorney, Agent, or Firm—Burns, Doane, Swecker & Mathis

[57] ABSTRACT

The invention relates to an electronic game comprising a LCD game in which various elements of the game may be controlled by a player having to locate balls in recesses in the manner of a traditional rolling ball game. The game comprises a LCD 1, control means for generating the LCD image and for controlling a game thereon, a graphic display surrounding the LCD and including recesses 3 in which metal balls 4 may be received. The recesses include electrical contacts which are bridged by a ball when received therein to generate a signal whereby the ball rolling and electronic components may interface.

6 Claims, 2 Drawing Sheets

ELECTRONIC GAME

FIELD OF THE INVENTION

This invention relates to the field of electronic games, and in particular to hand-held games having a liquid crystal display (LCD).

BACKGROUND OF THE INVENTION

Many types of portable hand-held LCD game are known, and such games have become very popular in recent years. As such they may be regarded as having replaced more traditional childrens games. An example of such a traditional game would be various types of rolling ball games in which an object of the game is to locate small metal balls in one or more holes, the holes typically being provided at a suitable locations on a background scene, for example the eyes of a face. It is an object of this invention to provide a hand-held electronic game which combines elements of a traditional ball rolling game with a LCD game.

SUMMARY OF THE INVENTION

Viewed from one broad aspect the present invention provides an electronic hand-held game comprising, a LCD display means, control means for generating a game to be displayed on said LCD display means, control input means whereby in use a player may control elements of the game, at least one ball and at least one corresponding recess for receiving said at least one ball, and means whereby a player may control elements of the game by locating said at least one ball in said corresponding recess.

With such an arrangement a player may play the game by using conventional control inputs, e.g. buttons, and additionally may be able to control at least certain specified elements of the game by playing a ball rolling "game within a game" to locate the ball within the recess. For example, the electronic game may be configured so that on occasion the player has the opportunity to win some form of bonus and the bonus may be awarded to the player if he can locate the ball in the recess within a specified time. Preferably the said at least one ball may be made of metal and each said recess may be provided with two electrical contacts between which a contact is made by the ball when it is located in the recess. In this way it is possible to electrically detect when the ball is located in the recess and thus provide an interface between the electronic game and the ball rolling feature.

In one embodiment the game may have three different playing modes, for example one mode which combines the electronic game with a ball rolling game, a conventional electronic game, and a ball rolling game only. In the latter mode the electronics may be used, for example as a timer.

The game may have various different levels of difficulty, and these levels may apply both to the electronic component of the game and also to the ball rolling component. For example the value of the bonus to be gained by the player in the ball rolling component of the game may depend on the speed with which the player is able to locate the ball in the recess.

The game may also comprise sound and graphics effects as will readily be recognized by one skilled in the art.

DETAILED DESCRIPTION OF PREFERRED EMBODIMENT

Figure 1:
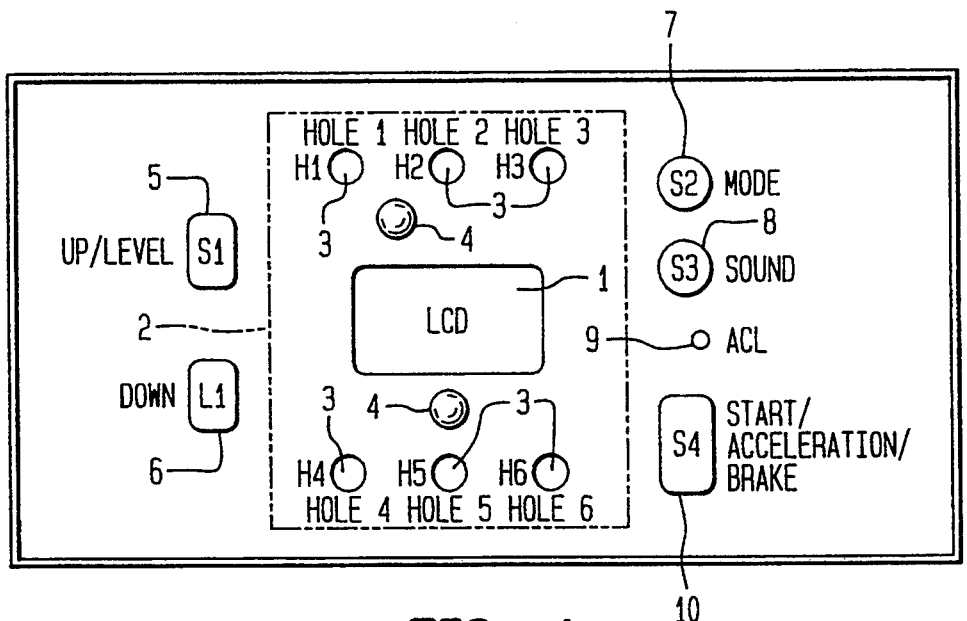
FIG. 1 is a schematic layout of the keys and display of a game according to one embodiment of the invention.

Referring firstly to FIG. 1 there is shown the general layout of the display and keys of an electronic game. The game apparatus comprises a LCD display 1 which may be surrounded by an illustrative/decorative graphic display 2 relating to the nature of the electronic game. Provided within this graphic 2 are six recesses 3, three provided in a line on either side of the LCD display 1. The LCD display 1, graphic display 2 are covered by a transparent plastics cover which defines thereunder a space within which are received two balls 4 which are free to roll over the surface of the graphic display 2. However, the balls 4 are prevented from rolling over the LCD display 1. It will be appreciated that the balls 4 are dimensioned so as to be received within the holes 3.

To either side of the displays are provided various buttons for providing control inputs for the game. These may include as examples game level up and down buttons 5,6, mode button 7, sound on/off button 8, reset button 9 and game operating button 10. Of course in different modes these buttons may have different assigned functions, as will become clear from the following description.

Although not shown, it will be appreciated that the various control buttons provide inputs to a control means, e.g. a microprocessor chip, that generates the LCD image and controls the game.

Figure 2:
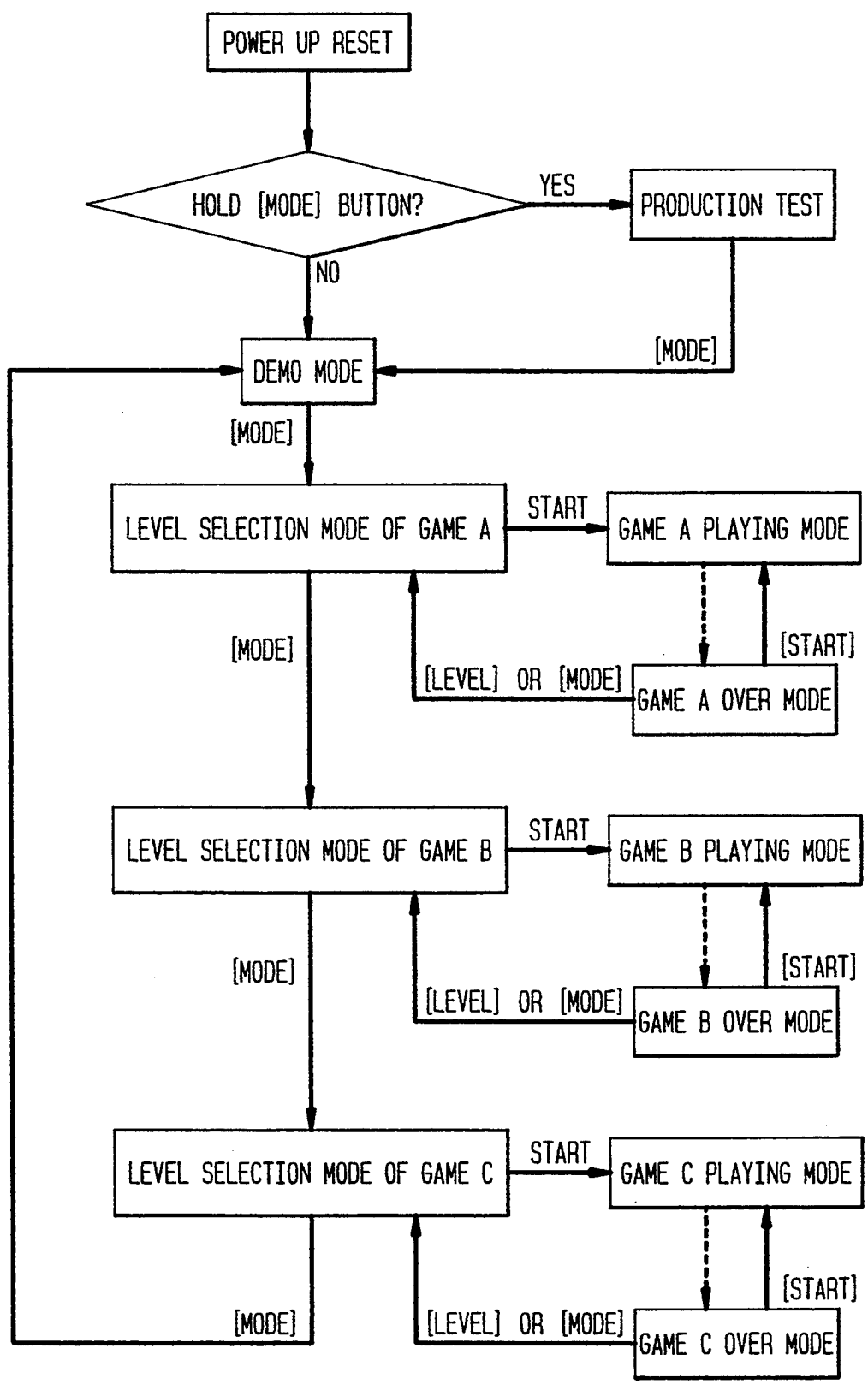
FIG. 2 is a flowchart illustrating the operation of the game in use.

The basic operation of the game will be described with reference to the flowchart of FIG. 2. The game may be powered by operating a power-on button or by pressing the reset button or by any other desired means. If the mode button 7 is held depressed the game will enter a test mode, otherwise the default mode is a demonstration mode. With depression of the mode button 7 the game will enter Game A level selection mode, a further depression leads to Game B level selection mode, and a third depression results in the game being in Game C level selection mode. Games A, B, and C will be described in detail later.

When the game is in any of the level selection modes, the level of difficulty for a given game may be selected using level button 5. When a game and level have been selected pressing operating button 10 acts to start a game. When playing a game various buttons, such as level buttons 5,6 may be used to control elements of the LCD forming part of the game. When any game is over, the game may be restarted or a player may choose a different level or game.

As such the game apparatus is conventional and it will be readily understood by one skilled in the art how the above games may be controlled by a conventional microprocessor chip which generates the LCD display. However in the present invention the nature of the games is very different from conventional games known in thee art as will become clear from the following description.

Game A may for example comprise a form of space attack game. By operation of the level buttons 5,6 a player may control a "spaceship", and by means of operating button 10 a player may fire "weapons" at a game generated target. In reply the game may generate attacks on the "spaceship". After a certain number of hits on the spaceship the game will be over. At certain times in the game, however, the game may give the player an opportunity to win a bonus either by acquiring extra weapons or extra "lifes", i.e. extra hits on the spaceship before the game is completed. To gain such a bonus the game will ask a player, by suitable indication means, to locate the two balls 4 in selected of the recesses 3. There may be a requirement to achieve this in a specified time, and/or the value of the bonus may increase with the speed with which the object is achieved.

Figure 3:
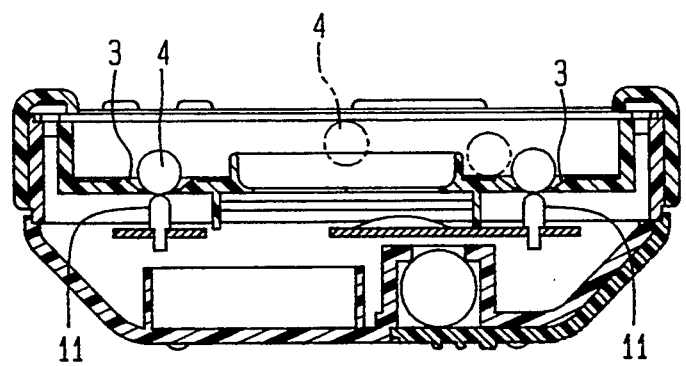
FIG. 3 is a sectional view through one embodiment of the invention.

FIG. 3 illustrates a recess 3. In the base of a recess are provided two electrical contacts 11, only one of which can be seen in FIG. 3. The contacts 11 connect the recesses to the main control means and when a metal ball is received in the recess the contacts are connected to generate a signal indicative of the ball being received within the recess. This signal may be used to time how long it takes a player to put the balls in the recesses and thus decide whether or not to award the player a bonus and, if so, how large a bonus should be awarded.

In Game B the ball rolling function is absent and the game functions only as a conventional LCD game.

In Game C the LCD game is inoperative and instead a game may be played in which the object is to locate the two balls in two recesses chosen by the game within a specified time, a score being given that depends on the speed in which the task is accomplished.

It will also be understood that the ball rolling component of the game could be incorporated into various different types of electronic LCD game. For example the LCD game could comprise a car racing game in which the object of the game could be to "drive" a "car" in a "race" while avoiding crashes. As a bonus the player could be awarded extra fuel or new lives by successfully completing a ball rolling task set by the game control means within a specified time.

It will also be appreciated that the electronic game need not necessarily be a LCD game, the ball rolling component as a "game within a game" could be incorporated into many different types of electronic game.

I claim:

1. An electronic hand-held game apparatus comprising, a liquid crystal display means, control means for generating an electronic game to be played on said display means, electronic control input means whereby in use a player may control elements of the game played on the liquid crystal display means, at least one ball and at least one corresponding recess for receiving said at least one bail, and means for operating .the game in three different modes, including means whereby a player may control elements of the game played on the liquid crystal control means by locating said at least one ball in a said recess during a first mode comprising an LCD game in which elements of said game are controlled by a ball rolling operation, and wherein said other two modes are a second mode comprising an LCD game only and a third mode comprising a ball rolling game only.

2. A game apparatus as claimed in claim 1 wherein each said ball is made of metal, and wherein a pair of electrical contacts are provided in each said recess whereby when a ball is located in a said recess an electrical connection is made by said ball between said contacts to generate an input signal to said control means.

3. A hand-held game apparatus comprising a liquid crystal display game, a ball rolling game, and mode controlling means for selecting a first mode in which the only liquid crystal display game is operative, a second mode in which only the ball rolling game is operative, and a third mode in which both of said games are operative.

4. An electronic hand-held game apparatus comprising, a liquid crystal display means, control means for generating an electronic game to be played on said display means, electronic control input means whereby in use a player may control elements of the game played on the liquid crystal display means, at least one ball and at least one corresponding recess for receiving said at least one ball, and means whereby a player may control elements of the game played on the liquid crystal control means by locating said at least one ball in a said recess, wherein said control means provides a player with an opportunity to win a bonus at selected stages of the game by locating a ball in a selected recess within a specified period of time.

5. An electronic hand-held game apparatus comprising a liquid crystal display means, control means for generating an electronic game to be played on said display means, electronic control input means including buttons actuated by a player during play of the game for controlling elements of the game played on the liquid crystal display means, at least one ball and at least one corresponding recess for receiving said at least one ball, and means whereby a player may control elements of the game played on the liquid crystal control means by locating said at least one ball in a said recess, wherein the location of a ball in a recess controls elements of the game in addition to the elements controlled by said buttons.

6. An electronic hand-held game apparatus comprising, a liquid crystal display means, control means for generating an electronic game to be played on said display means, electronic control input means whereby in use a player may control elements of the game played on the liquid crystal display means, at least one ball and at least one corresponding recess for receiving said at least one bail, and means whereby a player may control elements of the game played on the liquid crystal control means by locating said at least one ball in a said recess, wherein the location of a bail in a recess and said electronic control input means each provide control of elements during play of the game.

* * * * *